US007263142B2

(12) United States Patent
Kim et al.

(10) Patent No.: US 7,263,142 B2
(45) Date of Patent: Aug. 28, 2007

(54) APPARATUS AND METHOD FOR SYNCHRONIZING SYMBOL TIMING USING TIMING LOOP CONTROLLER

(75) Inventors: PanSoo Kim, Busan (KR); Young Wan Kim, Daejon (KR); Nae-soo Kim, Daejon (KR)

(73) Assignee: Electronics and Telecommunications Research Institute (KR)

( * ) Notice: Subject to any disclaimer, the term of this patent is extended or adjusted under 35 U.S.C. 154(b) by 729 days.

(21) Appl. No.: 10/722,103

(22) Filed: Nov. 24, 2003

(65) Prior Publication Data

US 2004/0105508 A1 Jun. 3, 2004

(30) Foreign Application Priority Data

Nov. 26, 2002 (KR) .............. 10-2002-0074005

(51) Int. Cl.
*H04L 27/06* (2006.01)
(52) U.S. Cl. ............. 375/344; 455/182.2; 455/192.2
(58) Field of Classification Search ........... 375/344, 375/286
See application file for complete search history.

(56) References Cited

U.S. PATENT DOCUMENTS

| 5,789,988 | A | 8/1998 | Sasaki |
| 5,878,088 | A | 3/1999 | Knutson et al. |
| 6,127,897 | A | 10/2000 | Sasaki |
| 6,266,377 | B1 | 7/2001 | Velez et al. |
| 6,278,746 | B1 | 8/2001 | Velez et al. |
| 6,583,822 | B1* | 6/2003 | Jun .............................. 348/537 |
| 6,785,074 | B2* | 8/2004 | Tsuchinaga ................ 360/39 |
| 2001/0031020 | A1* | 10/2001 | Hwang et al. ............. 375/316 |
| 2004/0095863 | A1* | 5/2004 | Verboom et al. ........ 369/47.28 |

FOREIGN PATENT DOCUMENTS

| KR | 2000-55154 | 9/2000 |
| KR | 2002-64849 | 8/2002 |

OTHER PUBLICATIONS

"The Performance of Symbol Timing Algorithm for Multi-level Modulation Scheme", J. Song, et al., IEEE Vehicular Technology Conference, 1996, p. 1883-1887.
Floyd M. Gardner, *A BPSK/QPSK Timing-Error Detector for Sampled Receivers*, IEEE Trasnactions on Communications, Vol. Com. 34, No. 5, May 1986, pp. 423-429.
Seok Jun Ko et al., *A Robust Digital Timing Recovery with Asymmetry Compensation for High Speed Optical Drive Systems*, IEEE Transactions on Consumer Electronics, vol. 47, No. 4, Nov. 2001, pp. 821-830.
"A Robust Digital Timing Recovery with Asymmetry Compensator for High Speed Optical Drive Systems", S. Ko, 2001 IEEE, vol. 47, No. 4, Aug. 20, 2001, pp. 821-830.

* cited by examiner

*Primary Examiner*—Dac V. Ha
(74) *Attorney, Agent, or Firm*—Blakely Sokoloff Taylor & Zafman (57) ABSTRACT

A timing loop controller for multilevel modulation scheme is disclosed. The timing loop controller includes a first to fourth computing unit for computing a timing error between an input timing of digital signals and a sampling timing; a first to fourth quantization unit for controlling a direction and an error value of the timing error; a first and second sign detection unit for detecting sign change according to results; a zero crossing detection unit for detecting zero crossing at I axis and Q axis; and a timing error control unit for controlling the timing error value in case there is no sign change. The present invention can increase a zitter performance of timing error according to the signal-to-noise ratio by detecting the timing error, outputting the timing error and controlling the timing error output value only in case there is sign change by additionally equipping the sign variation detector.

10 Claims, 8 Drawing Sheets

APPARATUS AND METHOD FOR SYNCHRONIZING SYMBOL TIMING USING TIMING LOOP CONTROLLER

FIELD OF THE INVENTION

The present invention relates to a symbol timing synchronizer and a method thereof; and, more particularly, to a symbol timing synchronizer using a timing synchronous loop controller for multilevel modulation scheme in order to detect and compensate symbol timing error of multilevel signal, a method thereof, and a computer readable recoding medium storing a program for executing the same method.

DESCRIPTION OF RELATED ART

Generally, in order to detect and compensate exact symbol timing error of an input signal, Gardner method is widely used. Gardner method is disclosed by F. M. Gardner at "A BPSK/QPSK Timing-error Detector for sample data receivers," IEEE Trans. Commun., vol. COM-34, pp. 423-429, May 1986.

Figure 1:
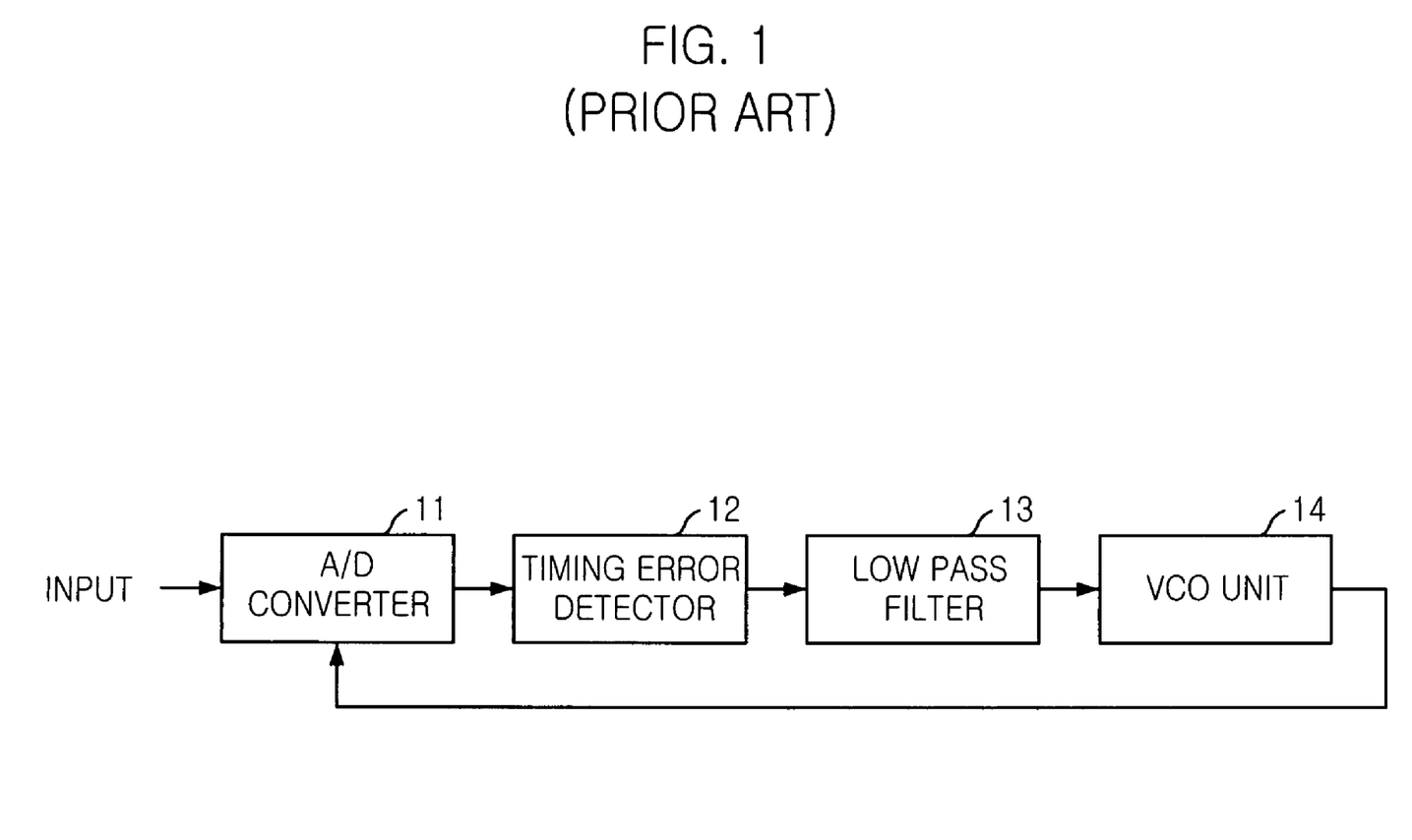
FIG. 1 is a circuit diagram showing a conventional timing fixed loop circuit.

FIG. 1 is a circuit diagram showing a conventional timing fixed loop circuit. The conventional timing fixed loop circuit is a symbol timing synchronizer synchronizing a timing of the input signal and a sampling timing of a receiver.

Referring to FIG. 1, the conventional timing fixed loop circuit includes an A/D converter 11 for converting an analogue signal to a digital signal, a timing error detector for detecting a timing error, a low pass filter 13 for eliminating noise, and a voltage controlled oscillator 14 for compensating the sampling timing and a timing point.

A transmission data passed through a wired/wireless channel is inputted to the A/D converter 11 after a frequency down conversion. The A/D converter 11 converts the analogue signal to the digital signal. The timing error detector 12 sequentially receives the digital signal and calculating a timing error. The timing error is transmitted to the low pass filter 13. The low pass filter 13 eliminates noise from the timing error and the noise eliminated timing error is passed to the VCO 14. The VCO 14 shifts the noise eliminated timing error as much as a difference for compensating timing error.

Figure 2:
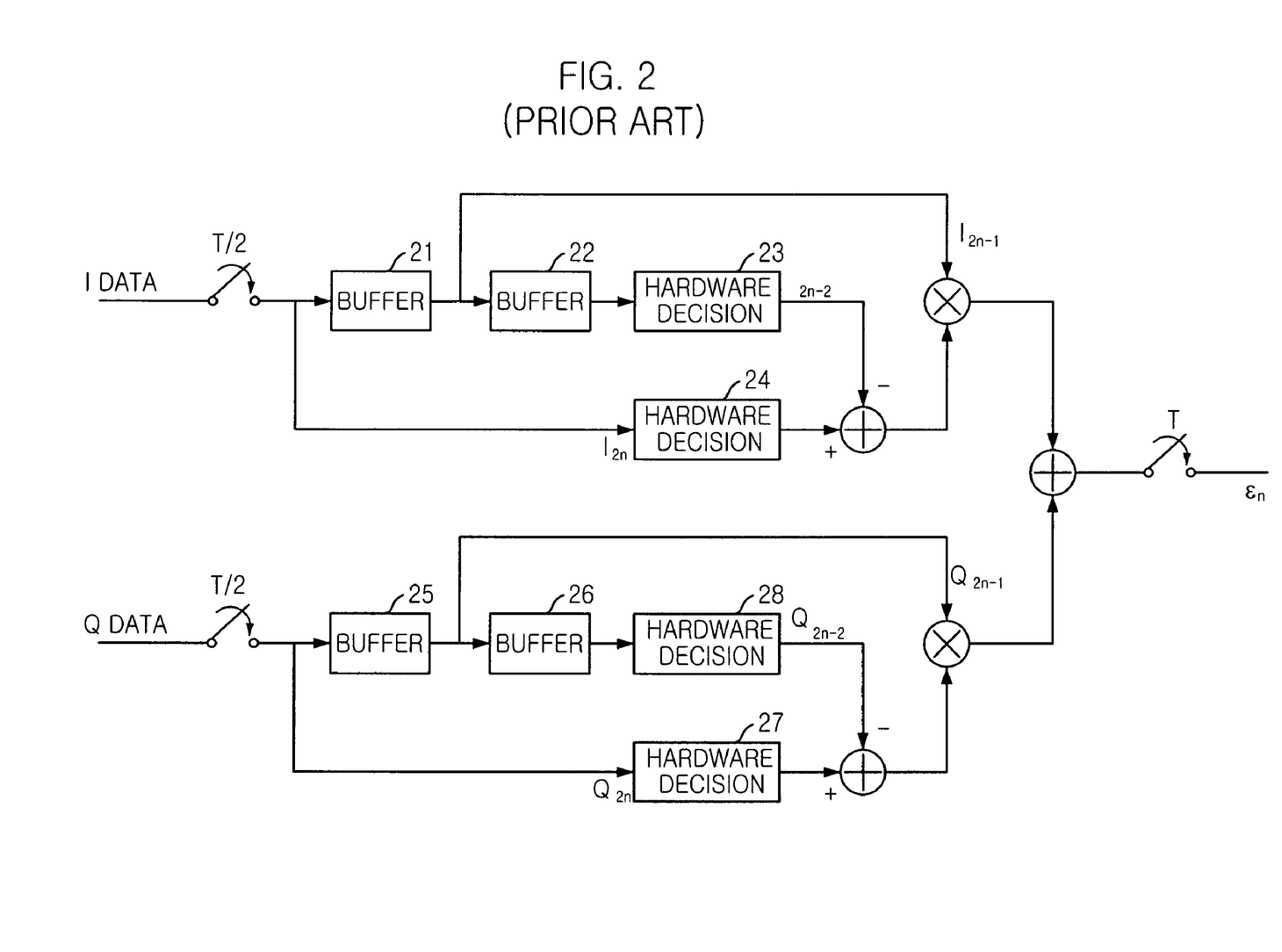
FIG. 2 is a circuit diagram of the timing error detector 12 in FIG. 1.

FIG. 2 is a circuit diagram of the timing error detector 12 in FIG. 1. As mentioned above, Gardner method detects a timing error as followings.

Referring to FIG. 2, the timing error detector 12 includes two buffers 21 and 22 on axis of In-phase, two other buffers 25 and 26 on axis of Quadrature-phase, two hardware decisions 23 and 24 on axis of In-phase, two other hardware decisions 27 and 28, two multipliers and three adders.

The buffers 21, 22, 25 and 26 store digital signals inputted to the A/D converter 11. The digital signals are sequentially inputted to the buffers. That is, digital signal $I_{2n-2}$, $Q_{2n-2}$, $I_{2n-1}$, $Q_{2n-1}$, $I_{2n}$ and $Q_{2n}$ are orderly inputted to the buffers 21, 22, 25 and 26. The hardware decision units 23, 24 27 and 28 performs hardware decision of each of digital signals to determine as 1 or −1 according to sign of the digital signals.

Therefore, a timing error finally is computed by using the multipliers and the adders.

However, the conventional timing error detector can calculate the timing error when the multilevel signals are not crossed at '0' point since the conventional timing error detector detects the timing error at every sample clock by using two digital signal per one symbol, which is inputted in order. It causes to increase a timing zitter since the conventional timing error detector may calculate a value not near to '0' point as the timing error. Also, a dispersion value of data sample values may be widely changed according to affection of signal to noise ratio in high-oder quadrature amplitude modulation signal, which has a irregularity of crossing of zero point since the timing error value is appeared at every sample clock.

SUMMARY OF THE INVENTION

It is, therefore, an object of the present invention to provide a symbol timing synchronizer using a timing synchronous loop controller for multilevel modulation scheme in order to overcome a characteristic of high order modulation method having irregular shift of zero crossing and its multilevel input signal, and in order to reduce dispersion value of timing errors according to a signal-to-noise ratio and a zitter value when detecting, a method thereof and a computer readable recoding medium storing a program for executing the same method.

It is another object of the present invention to provide a method and computer readable recoding medium storing a program for executing the same method, where in the method for multilevel modulation scheme in order to overcome a characteristic of high order modulation method having irregular shift of zero crossing and its multilevel input signal, and in order to reduce dispersion value of timing errors according to a signal-to-noise ratio and a zitter value when detecting.

In accordance with an aspect of the present invention, there is provided a timing loop controller for multilevel modulation scheme, including: a first buffer for orderly receiving I-channel digital signals and generating first buffered signals by buffering the received I-channel digital signals; a second buffer for receiving the received I-channel digital signals from the first buffer and generating second buffered digital signals; a first quantization unit for receiving the buffered digital signals from the second buffer and generating first quantized signals by quantizing the second buffered digital signals; a second quantization unit for receiving the I-channel digital signals and generating second quantized signals by quantizing the I-channel digital signals; a first sign detection unit for receiving the first quantized signals and the second quantized signals and detecting sign change of the first quantized signals and the second quantized signals; a third buffer for orderly receiving Q-channel digital signals and generating a third buffered signals by buffering the received Q-channel digital signals; a fourth buffer for receiving the received Q-channel digital signals from the first buffer and generating fourth buffered digital signals; a third quantization unit for receiving the fourth buffered digital signals from the fourth buffer and generating third quantized signals by quantizing the fourth buffered digital signals; a fourth quantization unit for receiving the Q-channel digital signals and generating fourth quantized signals by quantizing the Q-channel digital signals; a second sign detection unit for receiving the third quantized signals and the fourth quantized signals and detecting sign change of the third quantized signals and the fourth quantized signals; a timing error computation unit for computing a timing error output value based on the I-channel digital signals, the first buffered signals, the first quantized signals, the Q-channel digital signals, the third buffered signals, the third quantized signals and the fourth quantized signals; a zero crossing detection unit for detecting zero crossing at I axis and Q axis according based on results outputted from the first and second sign detection unit; and a timing error control unit for controlling the timing error value in case there is no sign change according to results outputted from the first and second sign detection unit.

In accordance with another aspect of the present invention, there is also provided a symbol timing synchronizer using a timing synchronous loop controller for multilevel modulation scheme, including: a A/D conversion unit for converting successively inputted analogue signals to digital signals; a timing error detection unit for calculating an timing error between an input timing of the digital signal successively inputted from the A/D conversion unit and a sampling timing of the A/D conversion unit and detecting sign change of the digital signals; a timing error output control unit for outputting the timing error calculated from the timing error detection unit and controlling the timing error output value; a filtering unit for eliminating a noise of the timing error value controlled by the timing error output control unit and calculating a mean value of errors; and a timing error compensation unit for compensating the timing error of the sampling timing of the A/D conversion unit by shifting the sampling timing corresponding to the calculated error value from the timing error detection unit.

In accordance with still another aspect of the present invention, there is also provided a method for synchronizing symbol timing by using a timing synchronous loop controller, the method including the steps of: a) converting successively inputted analogue signals to digital signals by an A/D conversion unit; b) calculating an timing error between an input timing of the digital signal successively inputted from the A/D conversion unit and a sampling timing of the A/D conversion unit and detecting sign change of the digital signals by a timing error detection unit; c) outputting the timing error calculated from the timing error detection unit and controlling the timing error output value; d) eliminating a noise of the timing error value and calculating a mean value of errors; and e) compensating the timing error of the sampling timing of the A/D conversion unit by shifting the sampling timing corresponding to the calculated error value from the timing error detection unit.

In accordance with further still another aspect of the present invention, there is also provided a computer readable recoding medium for storing instructions for executing a method for synchronizing a symbol timing by using a timing synchronous loop controller, the method including the steps of: a) converting successively inputted analogue signals to digital signals by an A/D conversion unit; b) calculating an timing error between an input timing of the digital signal successively inputted from the A/D conversion unit and a sampling timing of the A/D conversion unit and detecting sign change of the digital signals by a timing error detection unit; c) outputting the timing error calculated from the timing error detection unit and controlling the timing error output value; d) eliminating a noise of the timing error value and calculating a mean value of errors; and e) compensating the timing error of the sampling timing of the A/D conversion unit by shifting the sampling timing corresponding to the calculated error value from the timing error detection unit.

BRIEF DESCRIPTION OF THE DRAWING(S)

The above and other objects and features of the present invention will become apparent from the following description of the preferred embodiments given in conjunction with the accompanying drawings, in which.

DETAILED DESCRIPTION OF THE INVENTION

Other objects and aspects of the invention will become apparent from the following description of the embodiments with reference to the accompanying drawings, which is set forth hereinafter.

Figure 3:
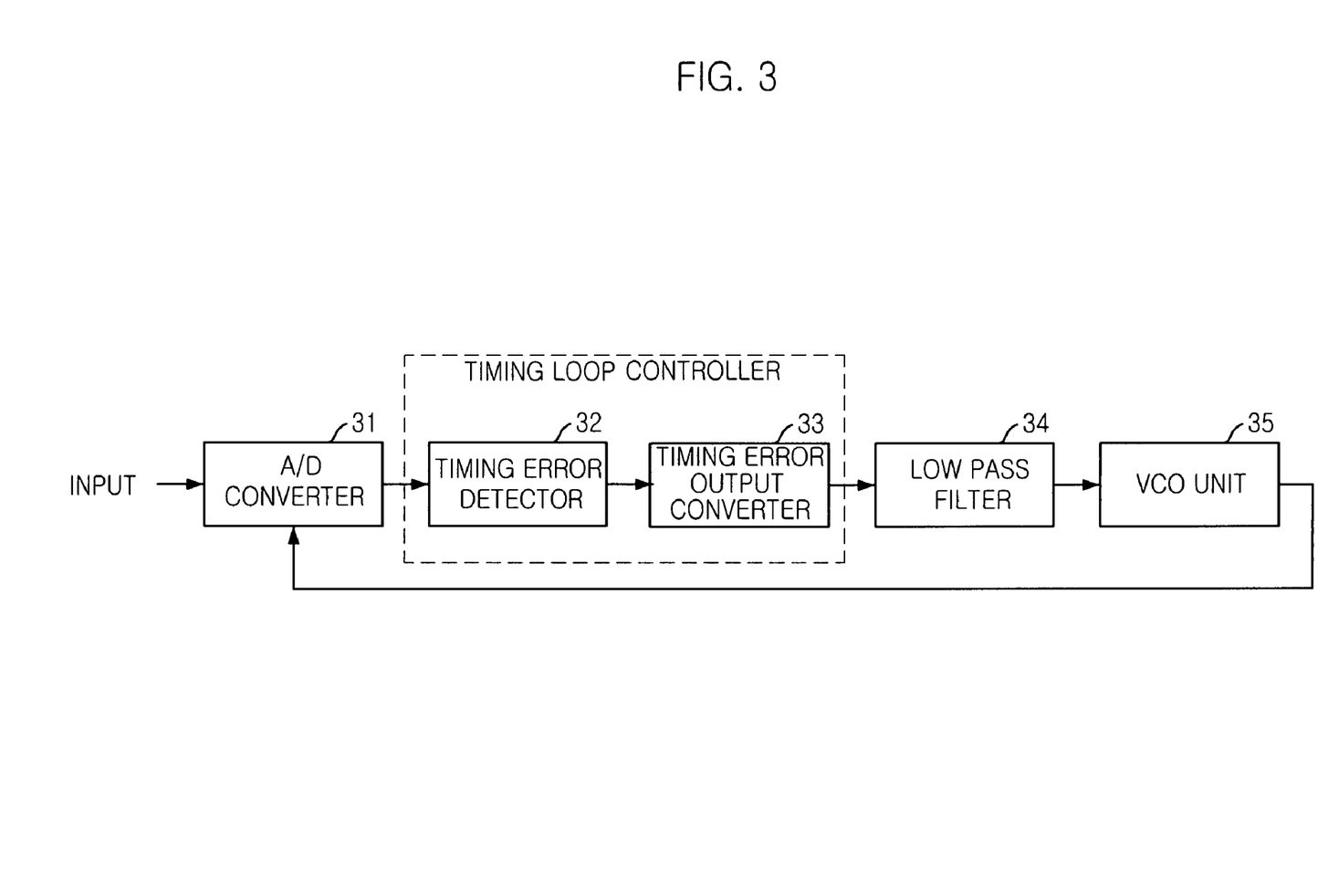
FIG. 3 is a diagram illustrating a symbol timing synchronizer using a timing loop controller in accordance with a preferred embodiment of the present invention.

FIG. 3 is a diagram illustrating a symbol timing synchronizer using a timing loop controller in accordance with a preferred embodiment of the present invention.

Referring to FIG. 3, the symbol timing synchronizer using the timing loop controller includes an analog/digital (A/D) converter 31 for converting successively inputted analogue signals to digital signals; a timing error detector 32 for calculating a timing error between the digital signal orderly inputted from the A/D converter and a sampling timing of the A/D converter 31 and detecting variation of sign of the digital signal; a timing error output controller 33 for outputting the timing error calculated from the timing error detector 32 and controlling the timing error output value; a low pass filter 34 for eliminating a noise of the timing error output value controlled by the timing error output controller 33 and calculating a mean value of timing error value; and a VCO unit 35 for compensating the timing error of the sampling timing in the A/D converter 31 by shifting the sampling timing corresponding to the timing error value calculated by the timing error detector 32.

The timing error detector 32 outputs the timing error by using the zero crossing detector (AND gate) 411. Also, the timing error detector 32 detects and traces the timing error by additionally equipping a gain controlled loop at back of the timing error detector 32 in order to control the timing error output signal in a modulation method having seldom zero crossing.

Figure 4:
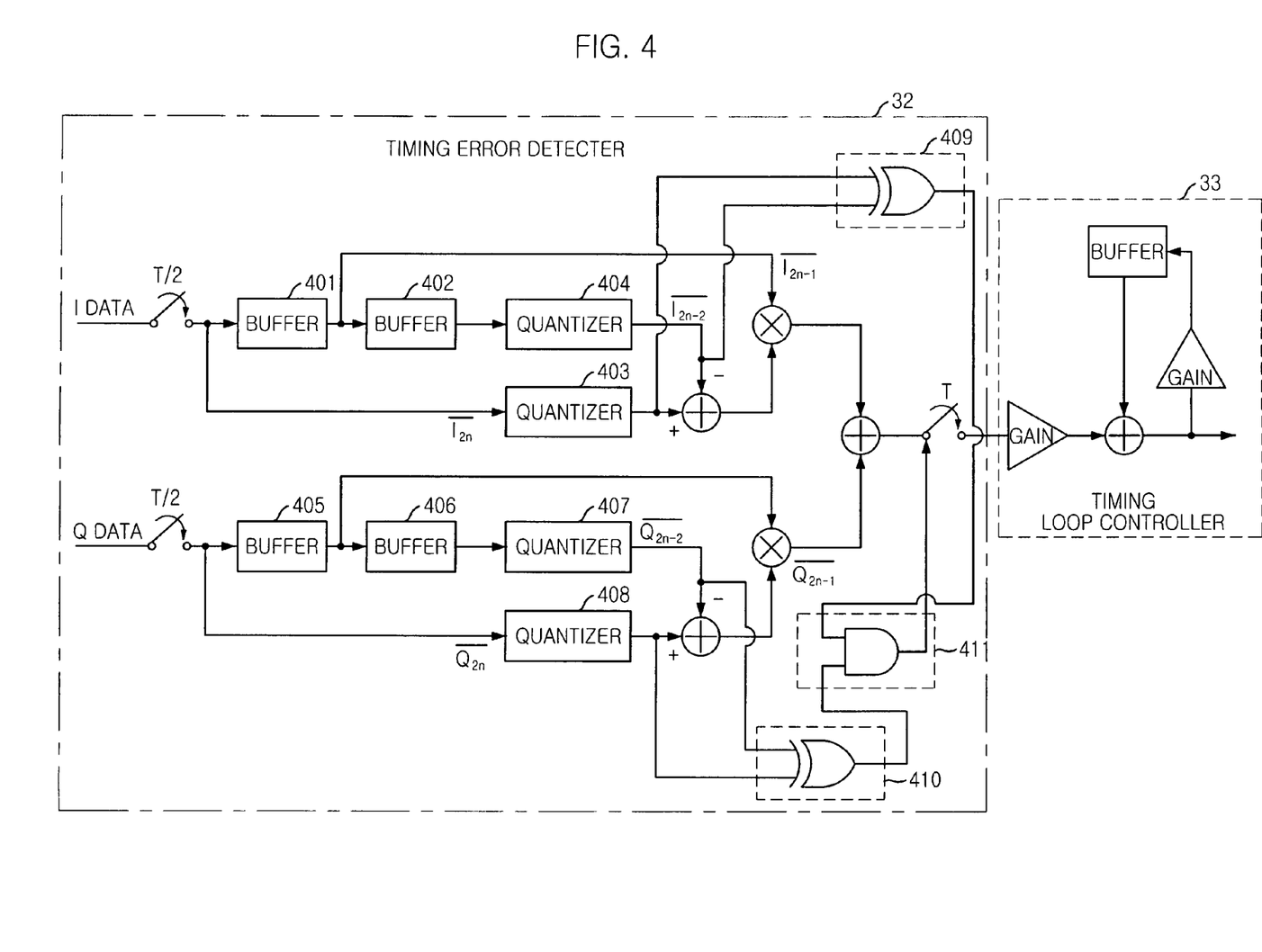
FIG. 4 is a diagram showing the timing synchronous loop controller in accordance with a preferred embodiment of the present invention.

FIG. 4 is a diagram showing the timing synchronous loop controller in accordance with a preferred embodiment of the present invention.

Referring to FIG. 4, the timing synchronous looped controller includes buffers 401, 402, 405 and 406 for calculating an input timing of digital signals orderly inputted from the A/D converter 31 and a sampling timing of the A/D converter 31, quantizers 403, 404, 407 and 408 for compensating a direction of timing error and an error value passed through the buffers, sign detectors (EX-OR gate) 409 and 410 for detecting a variation of sign according to result outputted from the quantizers, a zero crossing detector (AND gate) 411 for detecting a zero crossing of I axis and Q axis according to a detection result of the signal detectors 409 and 410 and a timing error detection controller 33 for controlling a timing error output value in case there is no sign change.

Inhere, the timing error output value ($\epsilon_n$) can be expressed by following equation 1.

$$\epsilon_n = \overline{I_{2n-1}}(\overline{I_{2n}} - \overline{I_{2n-2}}) + \overline{Q_{2n-1}}(\overline{Q_{2n}} - \overline{Q_{2n-2}}) \quad \text{Eq. 1}$$

$$\overline{I_{2n-1}} = (I_{2n-1} - 0.5 \cdot (I_{2n} + I_{2n-2}))$$

$$\overline{Q_{2n-1}} = (Q_{2n-1} - 0.5 \cdot (Q_{2n} + Q_{2n-2}))$$

$$\overline{I_{2n}} = 0.5 \cdot I_{2n}, \overline{Q_{2n-2}} = 0.5 \cdot Q_{2n-2}$$

$$\overline{I_{2n-2}} = 0.5 \cdot I_{2n-2}, \overline{Q_{2n-2}} = 0.5 \cdot Q_{2n-2}$$

In Eq.1, n is a natural number bigger than 1.

In case that the digital signal outputted from the A/D converter 31 is expressed k bits of sample unit, at most bit of the k bits of the digital signal is a sign bit and remained k-1 bits are data bits. When the EX-OR gates 409 and 410 are all ONs, a switch becomes ON for outputting the timing error value by operating the AND gate 411. In contrary, when the EX-OR gates are OFF, the timing error output value is controlled.

Figure 5A:
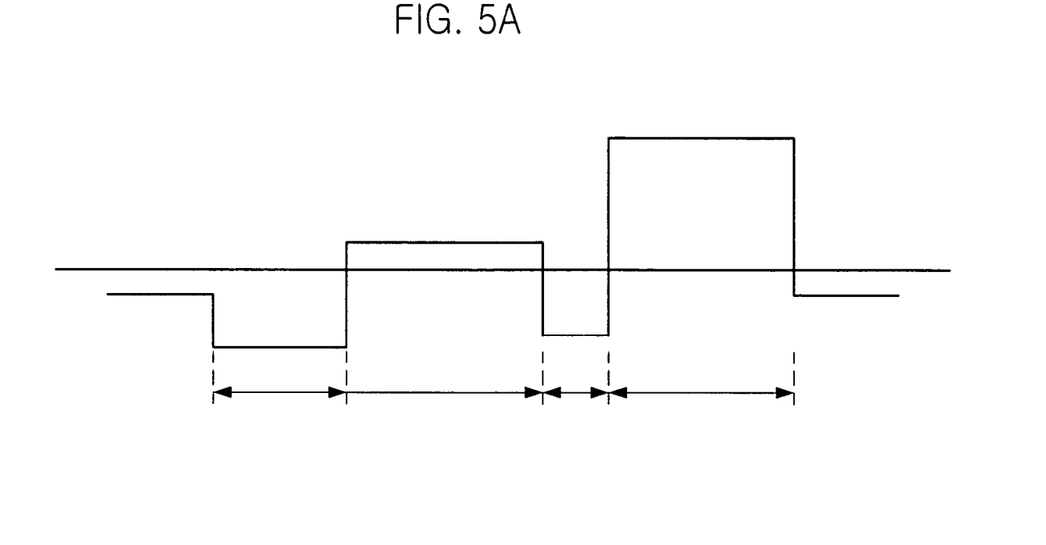
FIGS. 5A to 5C are graphs depicting timing error outputs generated according to a method for controlling timing error output value in accordance with a preferred embodiment of the present invention.
Figure 5B:
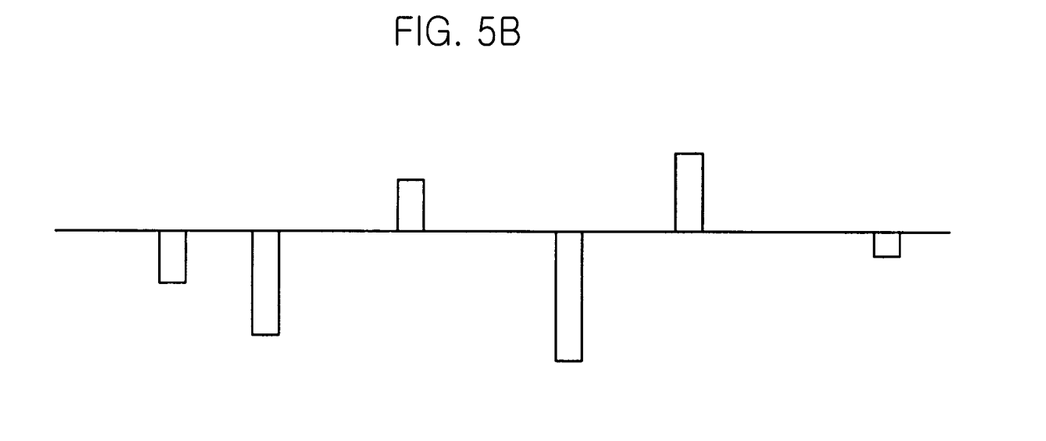
Figure 5C:
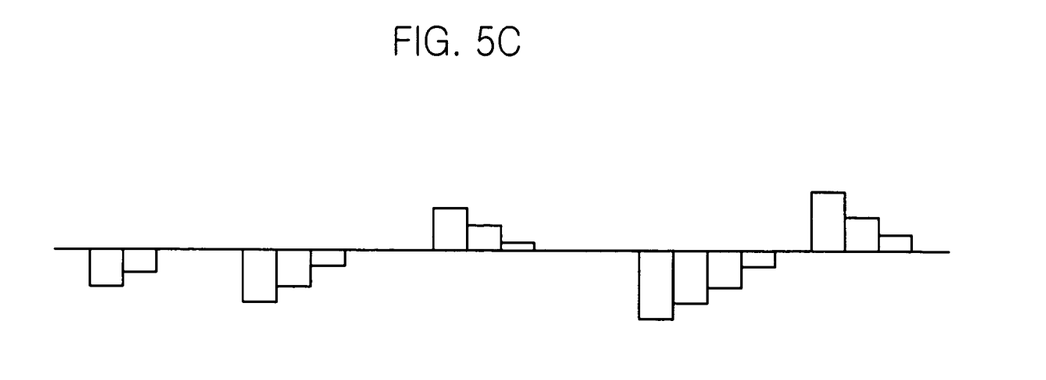

The conventional method maintains a timing error output value at a zero crossing point as like as FIG. 5A or outputs a timing error output value at the zero crossing point as like as FIG. 5B. In contrary, the present invention outputs the timing error value at the zero crossing point as like as FIG. 5C and updates the timing error value by using a gain value at the timing error output controller 33 in FIG. 4 when there is no the zero crossing point.

Figure 6:
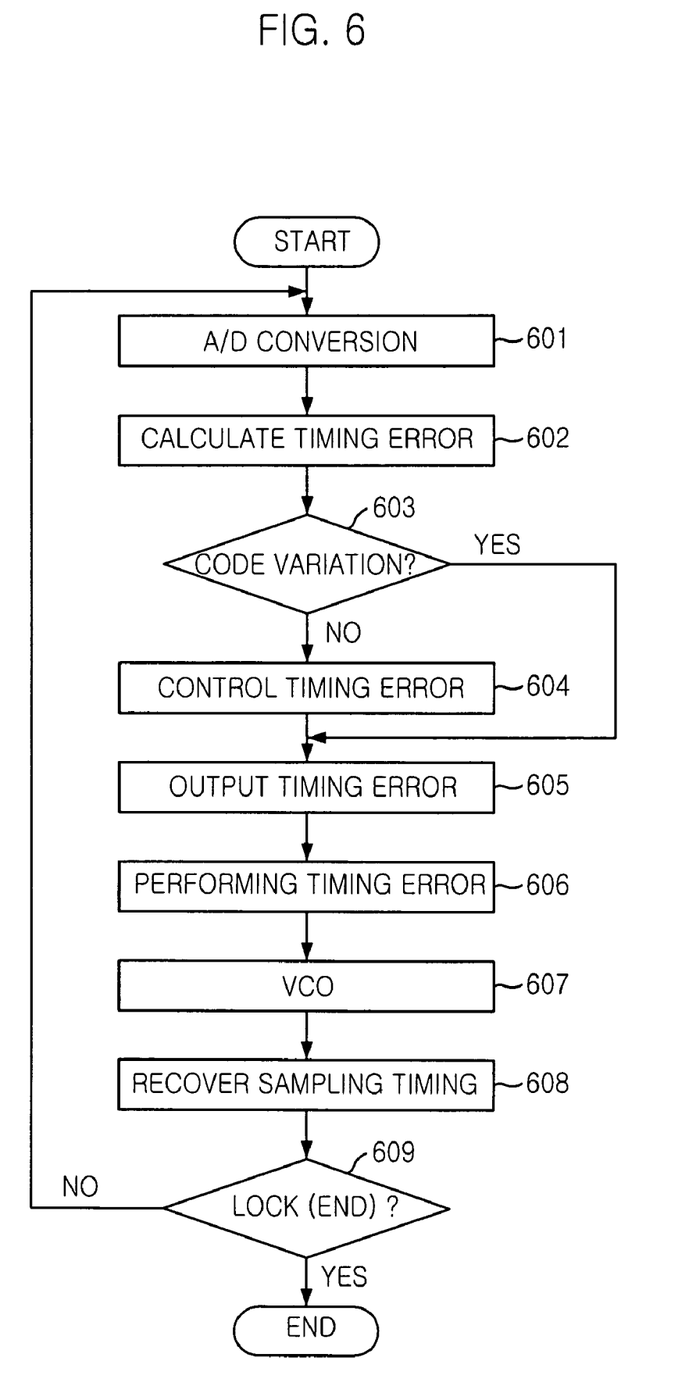
FIG. 6 is a flowchart explaining a method for a symbol timing synchronizing using a timing synchronous loop controller in accordance with a preferred embodiment of the present invention.

FIG. 6 is a flowchart explaining a method for a symbol timing synchronizing using a timing synchronous loop controller in accordance with a preferred embodiment of the present invention.

Referring to FIG. 6, at first, a sampling timing error of the digital signal and an input timing of digital signal is computed, a sign variation of the digital signal is detected, a calculated timing error calculated by a calculator is outputted in a case that the sign variation detector is operated by the sign detector and the timing error output value is controlled in a case that there is no sign change.

The method for symbol timing synchronizing by using the timing synchronous loop controller is explained in detail.

At first, analogue signals inputted from a receiver is converted to digital signals by the A/D converter at step 601.

At step 602, the timing error is calculated by the above mentioned method and a sign change is detected by the sign variation detectors 409 and 410 at step 603.

After detecting the sign variation, if there is sign change, the timing error is outputted at step 605 and if there is not sign change, the timing error value is changed by the gain controller at step 604. At step 605, the timing error value is outputted.

After the 605 step, a noise of the timing error value is eliminated by the low pass filter 34 and a mean value of errors is calculated at step 606. A sampling timing point is adaptively shifted according to the timing error value calculated at the low pass filter 34 and a sampling timing compensation processes are performed at steps of 607 and 608.

After compensating the sampling timing, the timing error detecting method is continuously performed while successively delaying according to the digital signal inputted when new digital signals are inputted in a certain period of time and if there is no new digital signal input in a certain period of time, the timing error detecting method is ended at step of 609.

In a meantime, a dispersion value of a signal-to-noise ratio is decreased and detection of the timing error is enhanced by controlling the quantizers and timing error output gain in FIG. 5. The present invention can be used as various implementation forms in the wired/wireless communication systems.

Also, in the present invention, the sign variation detector is implemented as EX-OR gate, however, it can be implemented by using a NOR gate or combination of AND or OR gates. The sampling timing controller is implemented by using a VCO in the present invention but other devices can be used for the sampling timing controller.

Figure 7:
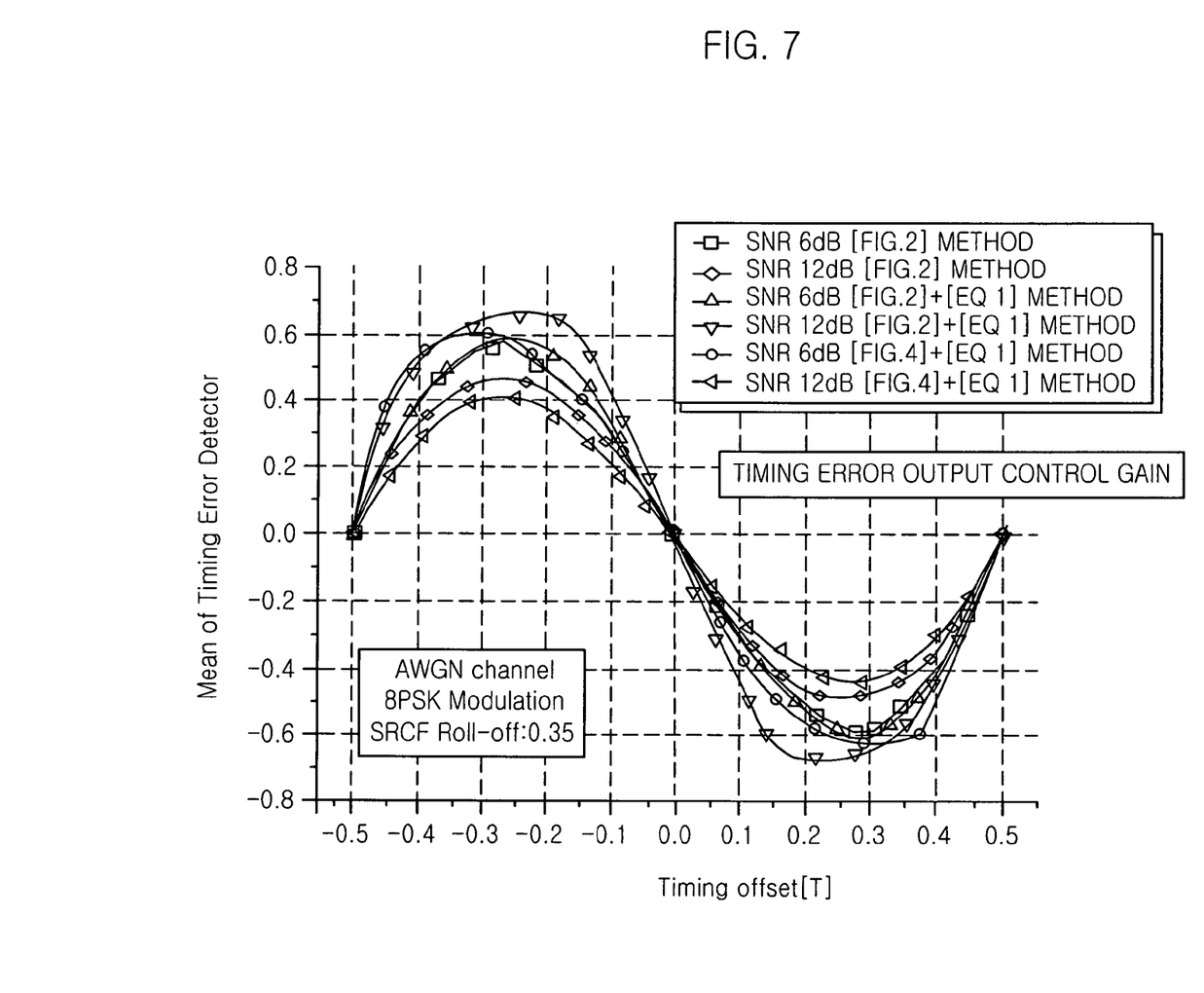
FIG. 7 is a graph representing results of mean values outputted from the timing error detector in accordance with a preferred embodiment of the present invention.

FIG. 7 is a graph representing results of mean values outputted from the timing error detector in accordance with a preferred embodiment of the present invention. The graph shows results of mean values computed by using a method of FIG. 2 and the method of FIG. 2 and Eq.1 and shows another result of mean values computed by using Eq.1 and a method of FIG. 4.

Figure 8:
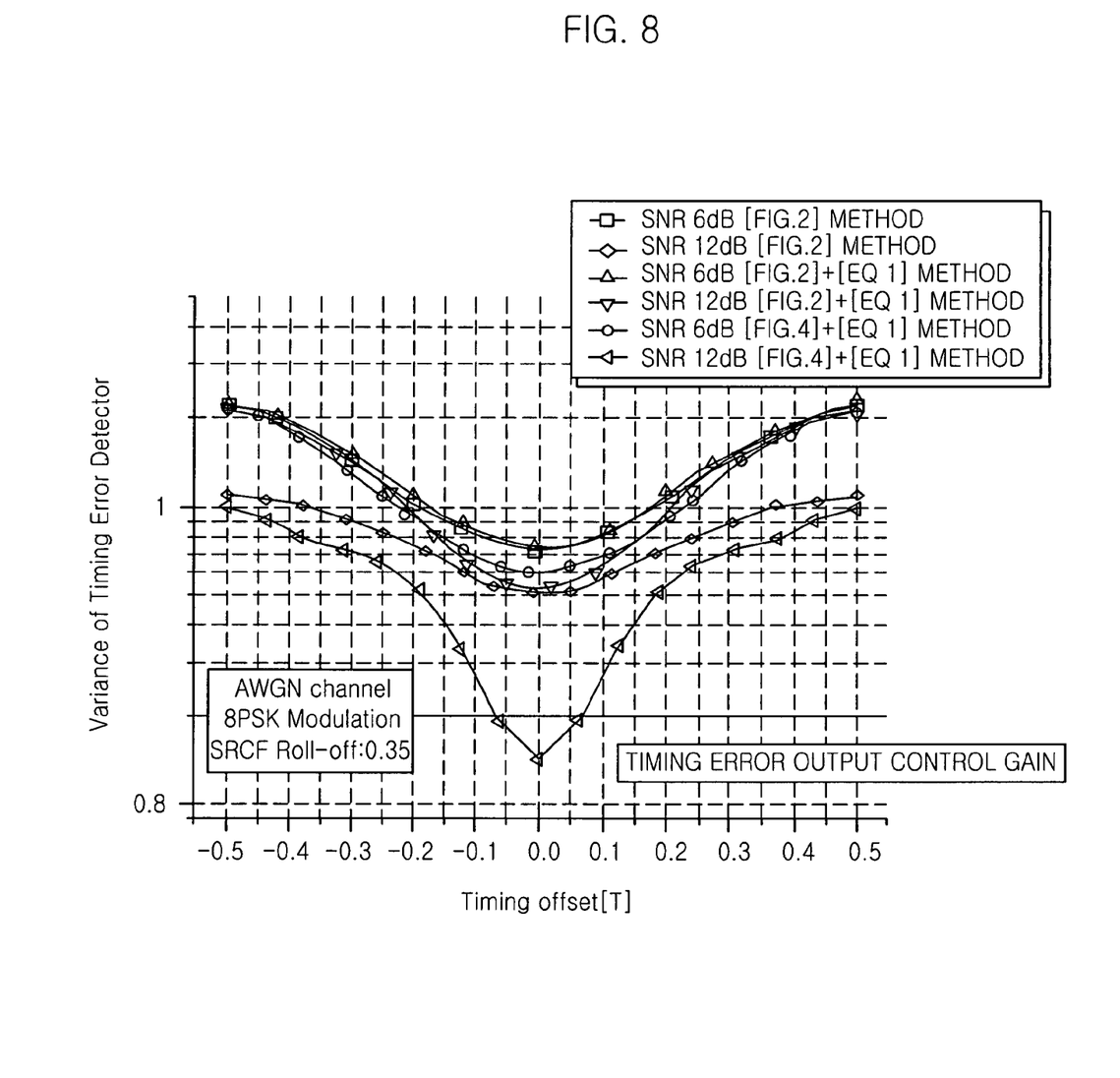
FIG. 8 is a graph showing results of dispersion values outputted from the timing error detector in accordance with a preferred embodiment of the present invention.

FIG. 8 is a graph showing results of dispersion values outputted from the timing error detector in accordance with a preferred embodiment of the present invention.

The above mentioned method can be implemented as a program for executing the same method and can be stored in a computer readable recording medium such as a CD-ROM, a RAM, a ROM, a floppy disk, a hard disk and an optical magnetic disk.

As mentioned above, the present invention can increase a zitter performance of timing error according to the signal-to-noise ratio by detecting the timing error by using the orderly inputted digital signal, outputting the timing error and controlling the timing error output value only in case there is sign change by additionally equipping the sign variation detector.

While the present invention has been described with respect to certain preferred embodiments, it will be apparent to those skilled in the art that various changes and modifications may be made without departing from the scope of the invention as defined in the following claims.

What is claimed is:

1. A timing loop controller for multilevel modulation scheme, comprising:

a first buffer for orderly receiving I-channel digital signals and generating first buffered signals by buffering the received I-channel digital signals;

a second buffer for receiving the received I-channel digital signals from the first buffer and generating second buffered digital signals;

a first quantization means for receiving the buffered digital signals from the second buffer and generating first quantized signals by quantizing the second buffered digital signals;

a second quantization means for receiving the I-channel digital signals and generating second quantized signals by quantizing the I-channel digital signals;

a first sign detection means for receiving the first quantized signals and the second quantized signals and detecting sign change of the first quantized signals and the second quantized signals;

a third buffer for orderly receiving Q-channel digital signals and generating a third buffered signals by buffering the received Q-channel digital signals;

a fourth buffer for receiving the received Q-channel digital signals from the first buffer and generating fourth buffered digital signals;

a third quantization means for receiving the fourth buffered digital signals from the fourth buffer and generating third quantized signals by quantizing the fourth buffered digital signals;

a fourth quantization means for receiving the Q-channel digital signals and generating fourth quantized signals by quantizing the Q-channel digital signals;

a second sign detection means for receiving the third quantized signals and the fourth quantized signals and detecting sign change of the third quantized signals and the fourth quantized signals;

a timing error computation means for computing a timing error output value based on the I-channel digital signals, the first buffered signals, the first quantized signals, the Q-channel digital signals, the third buffered signals, the third quantized signals and the fourth quantized signals;

a zero crossing detection means for detecting zero crossing at I axis and Q axis according based on results outputted from the first and second sign detection means; and a timing error control means for controlling the timing error value in case there is no sign change according to results outputted from the first and second sign detection means.

2. The timing loop controller as recited in claim 1, wherein the timing error computation means computes an error value ($E_n$) by following equation as:

$$E_n = \overline{(I_{2n-1}(I_{2n}-I_{2n-2})} + \overline{(Q_{2n-1}-Q_{2n-2})}$$

$$\overline{I_{2n-1}} = (I_{2n-1} - 0.5 \cdot (I_{2n} + I_{2n-2}))$$

$$\overline{Q_{2n-1}} = (Q_{2n-1} - 0.5 \cdot (Q_{2n} + Q_{2n-2}))$$

$$\overline{I_{2n}} = 0.5 \cdot I_{2n}, \quad \overline{Q_{2n}} = 0.5 \cdot Q_{2n}$$

$$\overline{I_{2n-2}} = 0.5 \cdot I_{2n-2}, \quad \overline{Q_{2n-2}} = 0.5 \cdot Q_{2n-2}$$

wherein the n is nature number bigger than 1, $\overline{I_{2n}}$ is the I-channel digital signal, $\overline{I_{2n-1}}$ is the first buffered signal, $\overline{I_{2n-2}}$ is the first quantized signal, $\overline{Q_{2n}}$ is the Q-channel digital signal, $\overline{Q_{2n-1}}$ is the third buffered signal, $\overline{Q_{2n-2}}$ is the third quantized signal.

3. A symbol timing synchronizer using a timing synchronous loop controller for multilevel modulation scheme, comprising:

A/D conversion means for converting successively inputted analogue signals to digital signals;

timing error detection means for calculating an timing error between an input timing of the digital signal successively inputted from the A/D conversion means and a sampling timing of the A/D conversion means and detecting sign change of the digital signals;

timing error output control means for outputting the timing error calculated from the timing error detection means and controlling the timing error output value if there is no sign change according to a detection result of a first sign detector means and a second sign detector means;

filtering means for eliminating a noise of the timing error value controlled by the timing error output control means and calculating a mean value of errors; and timing error compensation means for compensating the timing error of the sampling timing of the AID conversion means by shifting the sampling timing corresponding to the calculated error value from the timing error detection means.

4. The symbol timing synchronizer as recited in claim 3, wherein the timing error detection means includes:

a first buffer for orderly receiving I-channel digital signals and generating first buffered signals by buffering the received I-channel digital signals;

a second buffer for receiving the received I-channel digital signals from the first buffer and generating second buffered digital signals;

a first quantization means for receiving the buffered digital signals from the second buffer and generating first quantized signals by quantizing the second buffered digital signals;

a second quantization means for receiving the I-channel digital signals and generating second quantized signals by quantizing the I-channel digital signals, the first sign detection means for receiving the first ciuantized signals and the second ciuantized signals and detecting sign change of the first ciuantized signals and the second ciuantized signals;

a third buffer for orderly receiving Q-channel digital signals and generating a third buffered signals by buffering the received Q-channel digital signals;

a fourth buffer for receiving the received Q-channel digital signals from the first buffer and generating fourth buffered digital signals;

a third quantization means for receiving the fourth buffered digital signals from the fourth buffer and generating third quantized signals by quantizing the fourth buffered digital signals;

a fourth quantization means for receiving the Q-channel digital signals and generating fourth quantized signals by quantizing the Q-channel digital signals, the second sign detection means for receiving the third quantized signals and the fourth quantized signals and detecting sign change of the third quantized signals and the fourth quantized signals;

a timing error computation means for computing a timing error output value based on the I-channel digital signals, the first buffered signals, the first quantized signals, the Q-channel digital signals, the third buffered signals, the third quantized signals and the fourth quantized signals;

a zero crossing detection means for detecting zero crossing at I axis and Q axis according based on results outputted from the first and second sign detection means; and a timing error control means for controlling the timing error value in case there is no sign change according to results outputted from the first and second sign detection means.

5. The symbol timing synchronizer as recited in claim 3, wherein the timing error computation means computes an error value ($E_n$) by following equation as:

$$E_n = \overline{I_{2n-1}(I_{2n}-I_{2n-2})} + \overline{Q_{2n-1}(Q_{2n}-Q_{21n-2})}$$

$$\overline{I_{2n-1}} = (I_{2n-1} - 0.5 \cdot (I_{2n} + I_{2n-2}))$$

$$\overline{Q_{2n-1}} = (Q_{2n-1} - 0.5 \cdot (Q_{2n} + Q_{2n-2}))$$

$$\overline{I_{2n}} = 0.5 \cdot I_{2n}, \quad \overline{Q_{2n}} = 0.5 \cdot Q_{2n}$$

$$\overline{I_{2n-2}} = 0.5 \cdot I_{2n-2}, \quad \overline{Q_{2n-2}} = 0.5 \cdot Q_{2n-2}$$

wherein the n is nature number bigger than 1, $I_{2n}$ is the I-channel digital signal, $\overline{I_{2n-1}}$ is the first buffered signal, $I_{2n-2}$ is the first quantized signal, $\overline{Q_2}$ n is the Q-channel digital signal, $\overline{Q_{2n-1}}$ is the third buffered signal, $\overline{Q_{2n-2}}$ is the third quantized signal.

6. The symbol timing synchronizer as recited in claim 3, wherein the timing error detection means outputs the timing error by using the zero crossing detection means and detects and traces the timing error by controlling the timing error output signal by equipping a gain controlled loop at back of an output terminal of the timing error detection means in case of a modulation method having less zero crossing.

7. A method implemented for synchronizing symbol timing by using a timing synchronous loop controller, the method comprising the steps of:
   a) converting successively inputted analogue signals to digital signals by an A/D conversion unit;
   b) calculating an timing error between an input timing of the digital signal successively inputted from the A/D conversion unit and a sampling timing of the A/D conversion unit and detecting sign change of the digital signals by a timing error detection unit;
   c) outputting the timing error calculated from the timing error detection unit and controlling the timing error output value if there is no sign change according to a detection result of the timing error detection unit:
   d) eliminating a noise of the timing error value and calculating a mean value of errors; and
   e) compensating the timing error of the sampling timing of the A/D conversion unit by shifting the sampling timing corresponding to the calculated error value from the timing error detection unit.

8. The method as recited in claim 7, wherein the step b) includes the steps of:
   b1) computing a timing error between an input timing of orderly inputted digital signals and a sampling timing;
   b2) controlling a direction and an error value of the timing error;
   b3) detecting sign change according to results of step b2);
   b4) detecting zero crossing at I axis and Q axis according to results outputted from the step b3); and
   b5) controlling the timing error value in case there is no sign change according to results of step b4).

9. The method as recited in claim 8, wherein the step c) controls the timing error output value according to the result of the sign variation detector in case there is no sign variation.

10. A computer readable recoding medium for storing instructions for executing a method for synchronizing symbol timing by using a timing synchronous loop controller, the method comprising the steps of:
   a) converting successively inputted analogue signals to digital signals by an A/D conversion unit;
   b) calculating an timing error between an input timing of the digital signal successively inputted from the A/D conversion unit and a sampling timing of the A/D conversion unit and detecting sign change of the digital signals by a timing error detection unit;
   c) outputting the timing error calculated from the timing error detection unit and controlling the timing error output value if there is no sign change accordin to a detection result of the timing error detection unit;
   d) eliminating a noise of the timing error value and calculating a mean value of errors; and
   e) compensating the timing error of the sampling timing of the AID conversion unit by shifting the sampling timing corresponding to the calculated error value from the timing error detection unit.

* * * * *